AMPLITUDE MODULATED CARRIER TRANSMISSION SYSTEM

Filed March 26, 1959

INVENTOR.
ALLEN G. GATFIELD
BY Gust & Irish
ATTORNEYS

United States Patent Office 3,118,112

Patented Jan. 14, 1964

3,118,112

AMPLITUDE MODULATED CARRIER TRANSMISSION SYSTEM

Allen G. Gatfield, Fort Wayne, Ind., assignor to International Telephone and Telegraph Corporation Filed Mar. 26, 1959, Ser. No. 802,233
6 Claims. (Cl. 325—26)

This invention relates generally to amplitude modulated carrier transmission systems and methods including the modulation transmission and demodulation of an amplitude modulated signal, and more particularly relates to a system and apparatus for modulating and demodulating an amplitude modulated signal in which the frequency of the video signal closely approaches the frequency of the carrier.

The video signal provided by conventional television camera apparatus employing conventional scanning rates has a band width sufficiently broad to preclude its transmission over conventional telephone lines. There are instances, however, in which it is desirable to transmit a television video signal over narrow band transmission facilities, such as telephone lines, and various slow scanning camera apparatus has been devised for providing the requisite narrow band video signal. Although some narrow band television systems have been proposed which do not employ a carrier transmission system, the non-linear phase response of commercial narrow band transmission facilities, together with the D.C. and low frequency components of the narrow band video signal indicates the desirability of employing carrier transmission, i.e., modulating a carrier frequency with the video, signal; the band width limitations of narrow band transmission facilities, however, necessitates that a low frequency carrier be employed.

It is desirable in any carrier transmission system, and essential in a narrow band system, that maximum use be made of the available band width. However, to the best of the present applicant's knowledge, it has not in the past been considered possible to demodulate an amplitude modulated signal with a video frequency greater than one-half the carrier frequency. This is due to the fact that conventional demodulators operate on the envelope of the modulated waveform which, according to commonly accepted information and theory, ceases to exist as such when the modulating or video frequency becomes greater than one-half the carrier frequency; in practice, conventional envelope detectors do not work satisfactorily when the video frequency exceeds one-fifth of the carrier frequency.

In the case of the transmission of narrow band television video signals, the highest frequency of the video signal may closely approach the frequency of the carrier, and thus, demodulation of the resulting amplitude modulated carrier by conventional envelope detectors has been considered impossible by those skilled in the art. It is therefore desirable to provide a system and method for demodulating an amplitude modulated signal in which the video frequency very closely approaches the carrier frequency, thereby allowing maximum utilization of the available band width.

It is therefore an object of my invention to provide an improved amplitude modulated carrier transmission system.

Another object of my invention is to provide a system for demodulating an amplitude modulated carrier signal in which the video frequency closely approaches the carrier frequency.

A further object of my invention is to provide a method for demodulating an amplitude modulated carrier signal in which the frequency of the video signal is greater than one-half the carrier frequency.

The system and method of my invention is based on the spectral analysis of the wave form of an amplitude modulated carrier; I have found that when an amplitude signal in which the video frequency component has been suppressed is detected with a full wave detector, the carrier frequency component is doubled in frequency with the upper and lower side bands being shifted upward in frequency but retaining their same frequency relationship to the now doubled carrier frequency, and that surprisingly, the video frequency component reappears in the detected signal, thus permitting recovery of the video signal by filtering out all frequency components thereabove. Thus, my system and method permits the recovery of original video information from an amplitude modulated carrier when the highest video frequency is nearly equal to that of the carrier, this video information being recovered in substantially undistorted form without other related frequency components which are not part of the original video information.

The above mentioned and other features and objects of this invention and the manner of attaining them will become more apparent and the invention itself will be best understood by reference to the following description of an embodiment of the invention taken in conjunction with the accompanying drawings, wherein.

Figure 1:
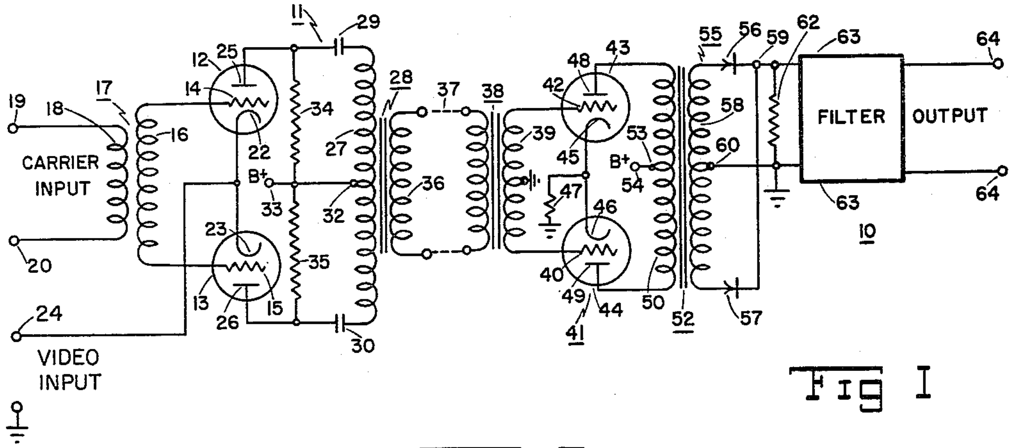
FIG. 1 is a schematic illustration showing the system of my invention.

Referring now to FIG. 1 of the drawing, the narrow band amplitude modulated carrier transmission system of my invention, generally identified as 10, comprises a balanced modulator 11 arranged for suppression or balancing-out of the video signal. Thus, balanced modulator 11 comprises a pair of tubes 12 and 13, shown here schematically as being of the triode type, with their control grids 14 and 15 being respectively connected to the ends of secondary winding 16 of coupling transformer 17 which in turn has its primary winding 18 connected to input terminals 19, 20, which are adapted to be connected to the source of sinusoidal carrier frequency (not shown). Cathodes 22 and 23 of balanced modulator tubes 12 and 13 are connected to video signal input terminal 24. It will at this point be recognized that the carrier and video signal input connections are reversed from those which are employed in a conventional balanced modulator arrangement in which the carrier component is suppressed. However, the suppression of the modulating or video signal in a balanced modulator rather than the carrier component has been proposed and thus the specific balanced modulator circuitry arranged for suppressing the video signal in the modulated output signal does not form a part of my invention, per se. The plates 25 and 26 of balanced modulator tubes 12 and 13 are respectively connected to the ends of primary winding 27 of output transformer 28 by coupling capacitors 29 and 30 with midpoint 32 of primary winding 27 being connected to a suitable source 33 of positive plate potential. Plate resistors 34 and 35 are respectively connected to plates 25 and 26 and to source 33 of plate potential, as is well known in the art. The secondary or output winding 36 of the output transformer 28 feeds a narrow band transmission facility, schematically indicated by dashed lines 37, which may typically be a conventional narrow band telephone line.

The narrow band transmission line 37 terminates at the receiving end in matching transformer 38 having the ends of its secondary winding 39 connected respectively to control grids 40 and 42 of tubes 43 and 44 of a conventional push-pull amplifier 41. The cathodes 45 and 46 of the demodulator-driver amplifier 41 are connected to ground by a suitable cathode resistor 47 while plates 48 and 49 of tubes 43 and 44 are connected to the ends of primary winding 50 of detector driving transformer 52 with center tap 53 being connected to a suitable source 54 of positive plate potential. It will now be readily seen that the full wave detector 55 is driven with a split phase or push-pull signal.

Detector 55 is a full-wave diode detector comprising diode or other suitable half-wave rectifier or detector elements 56 and 57 respectively connected to the ends of secondary winding 58 of detector driver transformer 52. Diodes 56 and 57 are connected together at 59 to form one output terminal of the detector while the center tap 60 of secondary winding 58 of detector driver transformer 52 forms the other output terminal of the detector as is well understood in the art, with load resistor 62 being connected across the output terminals 59 and 60. As will be hereinafter more fully described, a suitable sharp cut-off filter network 63 is connected between load resistor 62 and output terminals 64, filter 63 being tuned to cut-off or suppress all frequency components above the highest frequency of the input video signal.

Figure 2:
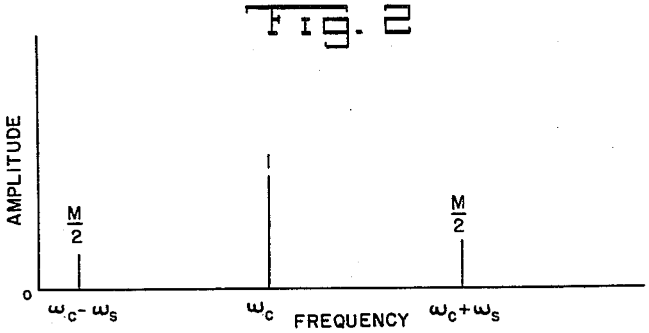
FIG. 2 is a spectrum diagram of the amplitude modulated signal received by the demodulator of my invention.

Referring now additionally to FIG. 2 of the drawing, the carrier frequency ($\omega_c$) is shown as being at 3.5 kilocycles and the video signal frequency ($\omega_s$) as being 3.2 kilocycles. Thus, the output of the modulated output signal from balanced modulator 11 with the video signal component suppressed or balanced-out will be as shown in FIG. 2, i.e., a carrier frequency of 3.5 kilocycles with a lower side band of 300 cycles and an upper side band of 6.7 kilocycles; it will be comprehended that single side band transmission can be employed in my system and method since it is not necessary that both side band frequencies be present for recovery of the video signal. Thus, the upper side band (6.7 kilocycles) can be eliminated since the action of the demodulator 55 is identical regardless of whether its input is single or double side band modulated.

The modulated signal passes through matching transformer 38, amplifier 41 and the detector driver transformer 52 without change in spectral content. However, at the load resistor 62 after passing through the full wave detector 55, the signal has the spectral content shown in FIG. 3. Here, as will be explained mathematically hereinafter, the carrier frequency has been doubled as a result of the full wave detection, and now appears at 7.0 kilocycles, with the upper and lower side bands being shifted upward in frequency so that their frequencies are now equaled to the doubled carrier frequency plus and minus the video frequency respectively, i.e., 10.2 kilocycles and 3.8 kilocycles. Furthermore, and surprisingly, mathematical analysis of the signal appearing across load resistor 62 reveals, and construction of the apparatus confirms, that the original video frequency $\omega_s$ of 3.2 kilocycles reappears as a component of the detected output signal across resistor 62. Since the original video signal is the desired output of the system, it will now be seen that it is only necessary to remove or filter out the undesired frequency components. Thus, filter 63 is provided having a cut-off as shown by the dashed line 65 in FIG. 3 which filters out or suppresses all frequency components to the right of the line 65, i.e., having frequencies above that of the original video signal. It is thus seen that the major component remaining in the output of filter 63 is the original video signal at 3.2 kilocycles, a low amplitude signal at a frequency double the original frequency of the lower side band also appearing, being, however, of such low amplitude as to be of no consequence.

The following mathematical analysis of the spectral content of the detected signal appearing across load resistor 62 will explain the mode of operation of the maximum bandwidth utilization demodulator system and method described above. Here, referring to FIG. 1 above, $e_{\text{input}}$=input voltage applied instantaneously to primary winding 50 of driver transformer 52 (assuming a one-to-one turns ratio)

$m$=modulation index $\omega_c$=carrier frequency $\omega_s$=video signal frequency thus, $$e_{\text{input}}=A\sin\omega_c t+\frac{Am}{2}\cos(\omega_c-\omega_s)t-\frac{Am}{2}\cos(\omega_c+\omega_s)t$$

let $$e_1=e_{\text{input}}$$
$$e_2=-e_1$$

where $e_1$ and $e_2$ are respectively the voltages appearing across the two halves of secondary winding 58 of driver transformer 52.

The non linear action of the diode detectors 56, 57 gives the following:

$$i_1=\frac{1}{R}[K_1e_1+K_2e_1^2+K_3e_1^3+K_4e_1^4+\ldots]$$

$$i_2=\frac{1}{R}[K_1e_2+K_2e_2^2+K_3e_2^3+K_4e_2^4+\ldots]$$

$$i_2=\frac{1}{R}[-K_1e_1+K_2e_1^2-K_3e_1^3+K_4e_1^4-\ldots]$$

$$i_1+i_2=\frac{1}{R}[2K_2e_1^2+2K_4e_1^4+\ldots]$$

where $i_1$ is the current flow in diode 56,
$i_2$ is the current flow in diode 57,
R is the resistance of load resistor 62, and
K is a constant for the particular diode characteristics.

It will be observed that when the currents $i_1$ and $i_2$ are added, the odd powered terms cancel out, thus leaving only the even powered terms; simple addition of the two currents $i_1$ and $i_2$ is possible since these currents never flow at the same time. Thus, $$e_3=(i_1+i_2)R$$
$$e_3=2K_2e_1^2+2K_4e_1^4\ldots$$

where $e_3$ is the voltage appearing across load resistor 62 (R). Considering now only the squared term, $$\frac{e_3}{2K_2}=e_1^2=\left[A\sin\omega_c t+\frac{Am}{2}\cos(\omega_c-\omega_s)t-\frac{Am}{2}\cos(\omega_c+\omega_s)t\right]^2$$

$$\frac{e_3}{2K_2A^2}=(\sin\omega_c t)^2+\frac{m^2}{4}[\cos(\omega_c-\omega_s)t]^2+\frac{m^2}{4}[\cos(\omega_c+\omega_s)t]^2+(2)(\sin\omega_c t)\left(\frac{M}{2}\right)(\cos(\omega_c-\omega_s)t)-(2)\left(\frac{M}{2}\right)(\sin\omega_c t)[\cos(\omega_c+\omega_s)t]-2\frac{m^2}{4}[\cos(\omega_c-\omega_s)t][\cos(\omega_c+\omega_s)t]$$

$$\frac{e_3}{2K_2A^2}=\frac{1}{2}-\frac{1}{2}\cos 2\omega_c t+\frac{m^2}{4}\left[\frac{1}{2}+\frac{1}{2}\cos 2(\omega_c-\omega_s t)\right]+\frac{m^2}{4}\left[\frac{1}{2}+\frac{1}{2}\cos 2(\omega_c+\omega_s)t\right]+\frac{m}{2}[\sin(\omega_c+\omega_c-\omega_s)t+\sin(\omega_c-\omega_c+\omega_s)t]-\frac{m}{2}[\sin(\omega_c+\omega_c+\omega_s)t+\sin(\omega_c-\omega_c-\omega_s)t]-\frac{m^2}{4}[\cos 2\omega_c t+\cos(-2\omega_s)t]$$

$$\frac{e_3}{2K_2A^2}=\frac{1}{2}+\frac{m^2}{4}-\frac{1}{2}\cos 2\omega_c t+\frac{m^2}{8}\cos 2(\omega_c-\omega_s)t$$
$$+\frac{m^2}{8}\cos 2(\omega_c+\omega_s)t+\frac{m}{2}\sin(2\omega_c-\omega_s)t$$
$$+\frac{m}{2}\sin\omega_s t-\frac{m}{2}[\sin(2\omega_c+\omega_s)t]+\frac{m}{2}\sin(+\omega_s)t$$

and thus:

$$\frac{e_3}{2K_2A^2}=\frac{1}{2}+\frac{m^2}{4}-\frac{1}{2}\cos 2\omega_c t+\frac{m^2}{8}\cos 2(\omega_c-\omega_s)t$$
$$+\frac{m^2}{8}\cos 2(\omega_c+\omega_s)t+\frac{m}{2}\sin(2\omega_c-\omega_s)t$$
$$-\frac{m}{2}\sin(2\omega_c+\omega_s)t+m\sin\omega_s t$$

It will be observed that the term $$\frac{1}{2}+\frac{m^2}{2}$$

in the above expression is a D.C. term which will be lost in the output transformer. The expression $$\frac{1}{2}\cos 2\omega_c t$$

will be recognized as the double frequency carrier. The expressions $$+\frac{m}{2}\sin(2\omega_c-\omega_s)t$$

and $$-\frac{m}{2}\sin(2\omega_c+\omega_s)t$$

will be recognized as the upper and lower side bands which bear the same frequency relationship to the doubled frequency carrier they formerly bore to the basic carrier frequency $\omega_c$. The expression $$\frac{m^2}{8}\cos 2(\omega_c+\omega_s)t$$

is recognized as a small amplitude signal at double the frequency of the original upper side band, this signal component of course being suppressed along with the double frequency carrier and the upper and lower side bands by the action of the filter 63. The expression $$\frac{m^2}{8}\cos 2(\omega_c-\omega_s)t$$

will be recognized as a small amplitude component having double the frequency of the original lower side band. Finally, the expression $m \sin \omega_s t$ is recognized as the original video signal.

Figure 3:
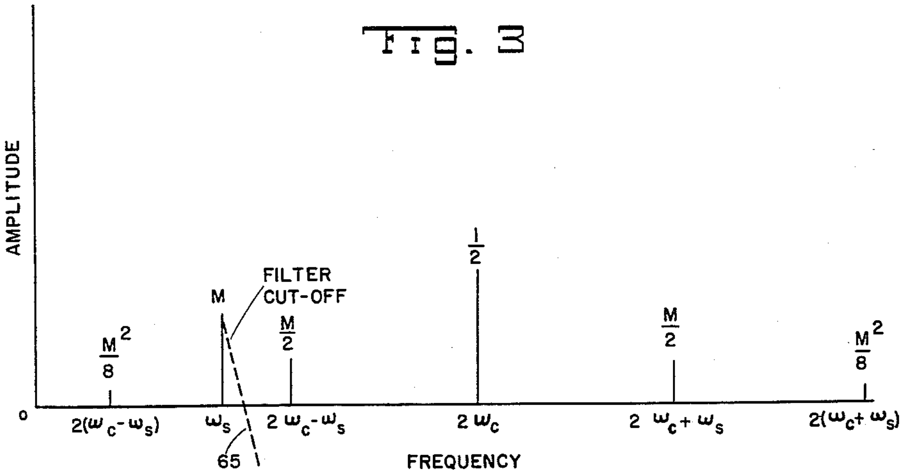
FIG. 3 is a spectrum diagram of the detected output signal of the demodulator.

It is thus seen that with a sharp cut-off filter 63 having a cut-off as indicated by the dashed line 65 in FIG. 3, all components above the frequency of the video will be removed. Thus, the only components of the detected signal appearing across resistor 62 which will appear across the output terminals 64 will be $m \sin \omega_s t$ (the video signal diminished by the amount of the modulation index) and the second harmonic of the original lower side band $$\frac{m^2}{8}\cos 2(\omega_c-\omega_s)t$$

which represents insignificant distortion in the desired signal. By limiting the modulation index to $$m=\frac{1}{4}$$

it is seen that the ratio between the desired signal and the distortion signal is $$\frac{m}{\frac{m^2}{8}}=\frac{8}{m}$$

that is, =32. It is thus seen that the undesired distortion component is only three percent (3%) of the desired signal.

It will now be seen that the demodulating system and method described hereinabove does not operate on the envelope-detection principle and therefore does not cease to work when the conventional modulation envelope ceases to exist. On the contrary, my system and method operates on the basic principle of the spectral analysis of the modulator wave form, this spectral analysis not breaking down under the conditions of video frequency nearly equalling the carrier frequency. The equipment incorporating this system and operated in accordance with the method described has actually been constructed and used with the ratio of video frequency to carrier frequency of $$\frac{3.2}{3.5}$$

indicated above, it being readily observed that the carrier frequency here is only 1.1 times the video frequency. It will be recognized that the essential elements of my system and method are the provision of a modulated signal in which the video frequency component has been suppressed or balanced out, a full wave detector and a sharp cut-off filter. It will, however, be readily recognized that other circuits and methods for suppressing the video signal component of the modulator signal may be employed and that other forms of full wave detectors may also be employed. It will further be understood that the filter 63 may be of conventional design, such as a four section, M-derived type, which may, however, be replaced by any conventional filter designed to provide the proper amplitude and phase response.

While I have described above the principles of my invention in connection with specific apparatus, it is to be clearly understood that this description is made only by way of example and not as a limitation to the scope of my invention.

What is claimed is:

1. An amplitude modulated carrier transmission system comprising: means for modulating a carrier wave with a video signal and including means for suppressing the video signal component in the modulated output signal; means for transmitting said modulated signal; detector means arranged to double the frequency of the carrier component of said modulated signal and to shift the upper and lower side bands to frequencies equal to the doubled carrier frequency plus and minus the video frequency respectively so that the video signal frequency reappears; and filter means arranged for suppressing said doubled frequency carrier and the frequency of said side bands in the output signal from said detector means.

2. An amplitude modulated carrier transmission system comprising: means for modulating a carrier wave with a video signal and including means for suppressing the video signal component in the modulated output signal; means for transmitting said modulated signal; means for receiving said modulated signal and including full wave detector means; and filter means coupled to said detector means for suppressing frequencies in the output signal from said detector means above the frequency of said video signal.

3. A narrow band amplitude modulated carrier transmission system comprising: balanced modulator means for modulating a carrier wave with a video signal and arranged to balance out the video signal component in the modulated output signal; narrow band means coupled to said modulator means for transmitting said modulated signal; means for receiving said modulated signal and including a full wave diode detector; and a sharp cut-off filter coupled to said detector and tuned to cut-off frequencies in the detected signal from said detector above the frequency of said video signal.

4. An amplitude modulator carrier transmission system comprising a transmitter, a receiver disposed remote from said transmitter, and a communication path interconnecting said transmitter and said receiver, said transmitter including means for modulating a carrier wave with a video siginal including means for suppressing the video signal component in the modulated output signal and means for coupling said modulated signal to said path, and said receiver including a detector means coupled to said path responsive to said modulated signal arranged to double the frequency of the carrier component of said modulated signal and to shift the upper and lower sidebands to frequencies equal to the doubled carrier frequency plus and minus the video frequency respectively so that the video signal frequency reappears and a filter network coupled to said detector means for suppressing said doubled frequency carrier and the frequencies of said sidebands in the output signal from said detector means.

5. An amplitude modulated carrier transmission system comprising a transmitter, a receiver disposed remote from said transmitter, and a communication path interconnecting said transmitter and said receiver, said transmitter including means for modulating a carrier wave with a video signal including means for suppressing the video signal component in the modulated output signal and means for coupling said modulated signal to said path, and said receiver including means coupled to said path for receiving said modulated signal including full wave detector means and a filter network coupled to said detector means for suppressing frequencies in the output signal from said detector means above the frequency of said video signal.

6. A narrow band amplitude modulated carrier transmission system comprising a transmitter, a receiver disposed remote from said transmitter and a narrow band communication path interconnecting said transmitter and said receiver, said transmitter including balanced modulator means for modulating a carrier wave with a video signal arranged to balance out the video signal component in the modulated output signal and means for coupling said modulated signal to said path, and said receiver including means coupled to said path for receiving said modulated signal including a full wave diode detector and a sharp cut-off filter coupled to said detector to cut off frequencies in the detected signal at the output of said detector above the frequency of said video signal.

References Cited in the file of this patent

UNITED STATES PATENTS

| | | |
|---|---|---|
| 2,144,778 | Schlesinger | Jan. 24, 1939 |
| 2,157,170 | Grundmann et al. | May 9, 1939 |
| 2,187,978 | Lewis | Jan. 23, 1940 |
| 2,441,127 | Atkins | May 11, 1948 |
| 2,653,221 | Carnahan | Sept. 22, 1953 |
| 2,699,494 | Albricht | Jan. 11, 1955 |

FOREIGN PATENTS

| | | |
|---|---|---|
| 1,145,390 | France | May 6, 1957 |